US 12,387,345 B2

United States Patent
Waez et al.

(10) Patent No.: US 12,387,345 B2
(45) Date of Patent: Aug. 12, 2025

(54) DYNAMIC BOUNDING BOX

(71) Applicants: Ford Global Technologies, LLC, Dearborn, MI (US); Massachusetts Institute of Technology, MIT Technology Licensing Office, Cambridge, MA (US)

(72) Inventors: Md Tawhid Bin Waez, Canton, MI (US); Yue Meng, Cambridge, MA (US); Zeng Qiu, Ann Arbor, MI (US); Chuchu Fan, Arlington, MA (US)

(73) Assignees: Ford Global Technologies, LLC, Dearborn, MI (US); Massachusetts Institute of Technology, Cambridge, MA (US)

( * ) Notice: Subject to any disclaimer, the term of this patent is extended or adjusted under 35 U.S.C. 154(b) by 464 days.

(21) Appl. No.: 17/932,056

(22) Filed: Sep. 14, 2022

(65) Prior Publication Data
US 2024/0087136 A1    Mar. 14, 2024

(51) Int. Cl.
*G06T 7/00* (2017.01)
*B60W 60/00* (2020.01)
*G06T 7/20* (2017.01)

(52) U.S. Cl.
CPC .......... *G06T 7/20* (2013.01); *B60W 60/0027* (2020.02); *G06T 2207/20081* (2013.01); *G06T 2207/20084* (2013.01); *G06T 2207/30241* (2013.01)

(58) Field of Classification Search
CPC ............. G06T 7/20; G06T 2207/20081; G06T 2207/20084; G06T 2207/30241; G06T 2207/30252; B60W 60/0027
See application file for complete search history.

(56) References Cited

U.S. PATENT DOCUMENTS

| | | | |
|---|---|---|---|
| 11,010,907 B1 * | 5/2021 | Bagwell | G05D 1/0221 |
| 2017/0372612 A1 * | 12/2017 | Bai | B60Q 9/008 |
| 2018/0120843 A1 * | 5/2018 | Berntorp | G06V 20/56 |
| 2019/0355134 A1 | 11/2019 | Vernaza et al. | |
| 2020/0086855 A1 * | 3/2020 | Packer | G05D 1/0289 |
| 2020/0086861 A1 | 3/2020 | McGill, Jr. et al. | |
| 2020/0174490 A1 * | 6/2020 | Ogale | G06N 3/045 |
| 2020/0293594 A1 * | 9/2020 | Raissi | G06F 30/27 |
| 2020/0302094 A1 | 9/2020 | Greenwood | |
| 2021/0370921 A1 * | 12/2021 | Silva | B60W 60/0027 |
| 2021/0394757 A1 * | 12/2021 | Beller | G05D 1/0088 |

(Continued)

OTHER PUBLICATIONS

Chen et al., "Optimal Safe Controller Synthesis: A Density Function Approach", arXiv:1909.11798v2 [math.OC] Sep. 27, 2019.

(Continued)

*Primary Examiner* — Van D Huynh
(74) *Attorney, Agent, or Firm* — Frank A. MacKenzie; Brooks Kushman P.C.

(57) ABSTRACT

A computer that includes a processor and a memory can determine a final trajectory for a vehicle by determining a candidate trajectory of a first object based on a detected second object. The candidate trajectory can be input to a reachable polyhedral marching processor to determine dynamic occupancy polyhedrals based on a shape of the candidate trajectory. A reachable tube can be determined based on combining the dynamic occupancy polyhedrals and the final trajectory can be determined based on the reachable tube avoiding the detected second object.

20 Claims, 8 Drawing Sheets

(56) References Cited

U.S. PATENT DOCUMENTS

| | | | |
|---|---|---|---|
| 2022/0169278 A1* | 6/2022 | Refaat | G06F 18/214 |
| 2023/0019731 A1* | 1/2023 | Revaud | G06T 7/215 |
| 2023/0117928 A1* | 4/2023 | Bellicoso | B25J 9/1666 |
| | | | 700/255 |
| 2024/0046129 A1* | 2/2024 | Li | G06N 7/01 |
| 2024/0086604 A1* | 3/2024 | Matei | G06F 30/3308 |

OTHER PUBLICATIONS

Meng et al., "Case Studies for Computing Density of Reachable States for Safe Autonomous Motion Planning", In: Deshmukh, J.V., Havelund, K., Perez, I. (eds) NASA Formal Methods. NFM 2022. Lecture Notes in Computer Science, vol. 13260. Springer, Cham. https://doi.org/10.1007/978-3-031-06773-0_13.

Meng et al., "Learning Density Distribution of Reachable States for Autonomous Systems", arXiv:2109.06728v1 [cs.AI] Sep. 14, 2021.

Rahman et al., "Formally Guaranteed Tight Dynamic Future Occupancy of Autonomous Vehicles", International Symposium on Formal Methods, FM 2021: Formal Methods pp. 763-775, Springer Link.

Vincent et al., "Reachable Polyhedral Marching (RPM): A Safety Verification Algorithm for Robotic Systems with Deep Neural Network Components", arXiv:2011.11609v1 [cs.RO] Nov. 23, 2020.

* cited by examiner

DYNAMIC BOUNDING BOX

BACKGROUND

Images can be acquired by sensors and processed using a computer to determine data regarding objects in an environment around a system. Operation of a sensing system can include acquiring accurate and timely data regarding objects in the system's environment. A computer can acquire images from one or more sensors that can be processed to determine data regarding objects in the system's environment. Data regarding objects in the environment can be combined with data regarding location of a system by a computer and used to operate systems including vehicles, robots, security systems, and/or object tracking systems.

DETAILED DESCRIPTION

Figure 1:
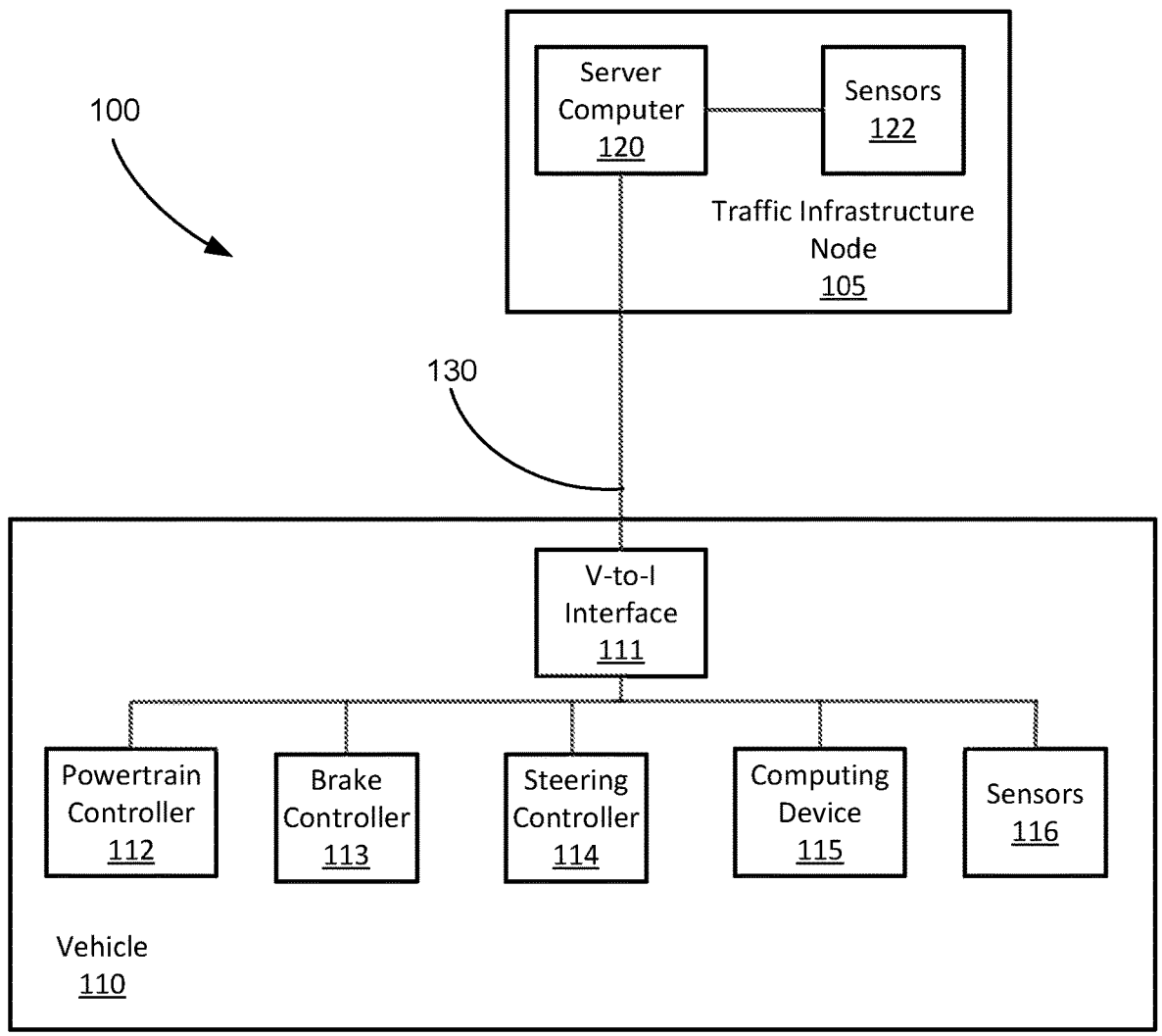
FIG. 1 is a block diagram of an example traffic infrastructure system.

As described herein, one or more software programs executing on a computer in a system can be used to determine data regarding objects in the system's environment and operate the system in the environment. Vehicle operation is used herein as an example of a system that acquires sensor data regarding objects in the vehicle's environment, processes the sensor data and operates the vehicle based on the processed sensor data. For example, a vehicle can acquire data regarding roadway lane markers, other vehicles, or pedestrians from sensors included in the vehicle. A computing device can determine a trajectory upon which to operate the vehicle based on predicted locations of the vehicle and determined locations of the objects in the environment. Lane keeping, where a vehicle stays within a lane, roadway exiting and entering, lane change maneuvers and object avoidance are examples of vehicle operations that can be performed based on predicted vehicle trajectories and object locations. Techniques described herein can be applied to other systems such as robots, security systems or object tracking systems.

A computer can acquire sensor data regarding objects in an environment around a vehicle and software programs included in the computer can identify and locate portions of the environment including roadway lanes and objects such as other vehicles and pedestrians. Based on the identified and located portions of the environment, a vehicle trajectory can be determined. A vehicle trajectory is a set of location values that includes velocities, e.g., speeds and headings, and lateral and longitudinal accelerations. Lateral and longitudinal accelerations can be determined based on the shape of the trajectory which indicate rate of change in lateral and longitudinal locations. The vehicle trajectory can be determined based on polynomial functions, for example. Advantageously, techniques described herein enhance vehicle operation by predicting locations of a vehicle based on dynamic occupancy. Techniques discussed herein can efficiently determine dynamic occupancy states for a vehicle based on acquired data regarding actual locations of vehicles with respect to predicted trajectories and determine dynamic bounding boxes for the vehicle based on the dynamic occupancy states. Dynamic bounding boxes can enhance the accuracy of predicting future locations of a vehicle as the vehicle travels on a predicted trajectory.

In examples of predicting locations of a system based on dynamic occupancy, the system can be a robot. In examples where the system is a robot, a candidate trajectory can be determined for a gripper attached to a robotic arm. A computing device in the robot can determine a candidate trajectory based on controlling actuators that can control movement of a gripper and a robotic arm to a position to permit the gripper to pick up a workpiece, for example. The candidate trajectory can be determined to avoid contact with a second object detected by sensors included in the robot. For example, a second object can be a second robot or portions of a conveyor belt that supports the workpiece. Dynamic occupancy techniques can enhance the operation of the robot by predicting locations of the gripper and robotic arm as it moves past the detected second object based on the candidate trajectory. Dynamic occupancy accurately predicts locations of the gripper and robotic arm based on the speed, lateral accelerations and longitudinal accelerations included in the candidate trajectory, to neither underestimate nor overestimate possible deviations from the candidate trajectory.

A method is disclosed herein, including determining a final trajectory by: determining a candidate trajectory of a first object based on a detected second object, inputting the candidate trajectory to a reachable polyhedral marching processor to determine dynamic occupancy polyhedrals based on a shape of the candidate trajectory, determining a reachable tube based on combining the dynamic occupancy polyhedrals, and determining the final trajectory based on the reachable tube avoiding the detected second object. The first object can be operated based on the final trajectory by controlling one or more actuators to control movement of the first object. The first object can be a vehicle and controlling the actuators to control the movement of the vehicle can include controlling one or more of vehicle powertrain, vehicle steering and vehicle brakes. The first object can be a robot and controlling the actuators to control the movement of the robot can include controlling motion of one or more of a gripper and a robotic arm. Inputting the candidate trajectory to a first neural network can include simplifying the candidate trajectory. The candidate trajectory can be a T*n matrix that includes x and y locations, velocities, and heading angles at a plurality of time steps t and simplifying the trajectory can reduce the T*n matrix to a vector with m dimensions, where m<T*n. The reachable polyhedral marching processor can be programmed based on weights output from a second neural network.

The second neural network can determine density distributions based on solving Liouville partial differential equations. The second neural network can be trained based on a plurality of trajectories acquired from real world vehicles. The second neural network can include fully connected neurons with ReLU activation and is trained based on stochastic gradient descent with L2-norm reconstruction loss. The dynamic occupancy polyhedrals can include two-dimensional regions wherein a probability that the first object will occupy locations within the reachable polyhedrals is higher than an empirically determined threshold. A size of the dynamic occupancy polyhedrals can be based on curvature and a distance between samples of segments of the candidate trajectory. The dynamic occupancy polyhedrals can have between six and eight sides. The second object can be one or more of a vehicle, a pedestrian, or a lane marker.

Further disclosed is a computer readable medium, storing program instructions for executing some or all of the above method steps. Further disclosed is a computer programmed for executing some or all of the above method steps, including a computer apparatus, programmed to determine a final trajectory by: determining a candidate trajectory of a first object based on a detected second object, inputting the candidate trajectory to a reachable polyhedral marching processor to determine dynamic occupancy polyhedrals based on a shape of the candidate trajectory, determining a reachable tube based on combining the dynamic occupancy polyhedrals, and determining the final trajectory based on the reachable tube avoiding the detected second object. The first object can be operated based on the final trajectory by controlling one or more actuators to control movement of the first object. The first object can be a vehicle and controlling the actuators to control the movement of the vehicle can include controlling one or more of vehicle powertrain, vehicle steering and vehicle brakes. The first object can be a robot and controlling the actuators to control the movement of the robot can include controlling motion of one or more of a gripper and a robotic arm. Inputting the candidate trajectory to a first neural network can include simplifying the candidate trajectory. The candidate trajectory can be a T*n matrix that includes x and y locations, velocities, and heading angles at a plurality of time steps t and simplifying the trajectory can reduce the T*n matrix to a vector with m dimensions, where m<T*n. The reachable polyhedral marching processor can be programmed based on weights output from a second neural network.

The instructions can include further instructions to determine density distributions based on solving Liouville partial differential equations with a second neural network. The second neural network can be trained based on a plurality of trajectories acquired from real world vehicles. The second neural network can include fully connected neurons with ReLU activation and is trained based on stochastic gradient descent with L2-norm reconstruction loss. The dynamic occupancy polyhedrals can include two-dimensional regions wherein a probability that the first object will occupy locations within the reachable polyhedrals is higher than an empirically determined threshold. A size of the dynamic occupancy polyhedrals can be based on curvature and a distance between samples of segments of the candidate trajectory. The dynamic occupancy polyhedrals can have between six and eight sides. The second object can be one or more of a vehicle, a pedestrian, or a lane marker.

FIG. 1 is a diagram of a sensing system 100 that can include a traffic infrastructure node 105 that includes a server computer 120 and stationary sensors 122. Sensing system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, i.e., via a vehicle communications bus as described further below, more than one computing devices, i.e., controllers or the like included in the vehicle 110 for monitoring and/or controlling various vehicle components, i.e., a powertrain controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in the vehicle and/or receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V2X) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and/or wireless networking technologies, i.e., cellular, BLUETOOTH®, Bluetooth Low Energy (BLE), Ultra-Wideband (UWB), Peer-to-Peer communication, UWB based Radar, IEEE 802.11, and/or other wired and/or wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and/or the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2X) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc., without intervention of a human operator. Using data received in the computing device 115, i.e., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, i.e., a passenger car, light truck, etc. The vehicle 110 includes one or more sensors 116, the V2X interface 111, the computing device 115 and one or more controllers 112, 113, 114. The sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in autonomous, semi-autonomous, or manual modes. By a semi- or fully-autonomous mode, we mean a mode of operation wherein a vehicle can be piloted partly or entirely by a computing device as part of a system having sensors and controllers. For purposes of this disclosure, an autonomous mode is defined as one in which each of vehicle propulsion (i.e., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer. In a semi-autonomous mode, some but not all of them are controlled by a computer.

A traffic infrastructure node 105 can include a physical structure such as a tower or other support structure (i.e., a pole, a box mountable to a bridge support, cell phone tower, road sign support, etc.) on which infrastructure sensors 122, as well as server computer 120, can be mounted, stored, and/or contained, and powered, etc. One traffic infrastructure node 105 is shown in FIG. 1 for ease of illustration, but the system 100 could and likely would include tens, hundreds, or thousands of traffic infrastructure nodes 105. The traffic infrastructure node 105 is typically stationary, i.e., fixed to and not able to move from a specific geographic location. The infrastructure sensors 122 may include one or more sensors such as described above for the vehicle 110 sensors 116, i.e., lidar, radar, cameras, ultrasonic sensors, etc. The infrastructure sensors 122 are fixed or stationary. That is, each sensor 122 is mounted to the infrastructure node so as to have a substantially unmoving and unchanging field of view.

Server computer 120 typically has features in common with the vehicle 110 V2X interface 111 and computing device 115, and therefore will not be described further to avoid redundancy. Although not shown for ease of illustration, the traffic infrastructure node 105 also includes a power source such as a battery, solar power cells, and/or a connection to a power grid. A traffic infrastructure node 105 server computer 120 and/or vehicle 110 computing device 115 can receive sensor 116, 122 data to monitor one or more objects. An "object," in the context of this disclosure, is a physical, i.e., material, structure or thing that can be detected by a vehicle sensor 116 and/or infrastructure sensor 122.

Figure 2:
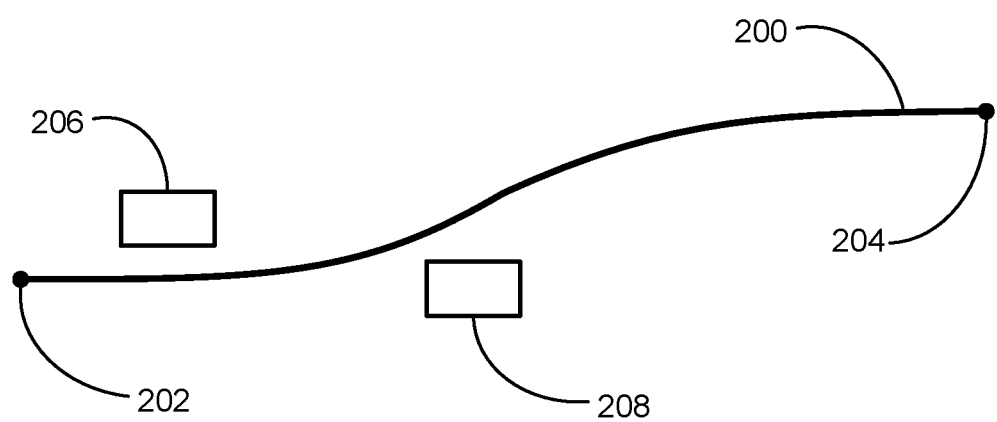
FIG. 2 is a diagram of an example vehicle trajectory.

FIG. 2 is a diagram of a vehicle trajectory 200 that can be determined by a computing device 115 in a vehicle 110. Vehicle trajectory 200 can include an initial location 202 for vehicle 110 and an end point 204. Trajectory 200 can be determined based on polynomial equations that connect initial location 202 and end point 204. The polynomial equations are typically defined in a plane parallel to a roadway and can be of the form $$t(x,y)=ax^2+bxy+cy^2+d \quad (1)$$

Where t(x,y) are the coordinates of the vehicle with respect to the roadway and the polynomial equation is a second degree polynomial in x and y. A vehicle trajectory can be determined based on upper and lower limits for lateral and longitudinal accelerations predicted for vehicle 110 as it travels along vehicle trajectory 200. Computing device 115 in vehicle 110 can also receive as input data from sensors 116 included in vehicle 110 to determine locations of objects 206, 208 near trajectory 200. For example, computing device can acquire video images from video sensors and input them to a neural network trained to locate objects 206, 208 in video images. Objects 206, 208 can be other vehicles, pedestrians, or traffic barriers, for example. Vehicle trajectory 200 can be determined by computing device 115 to avoid contact between vehicle 110 and objects 206, 208.

Figure 3:
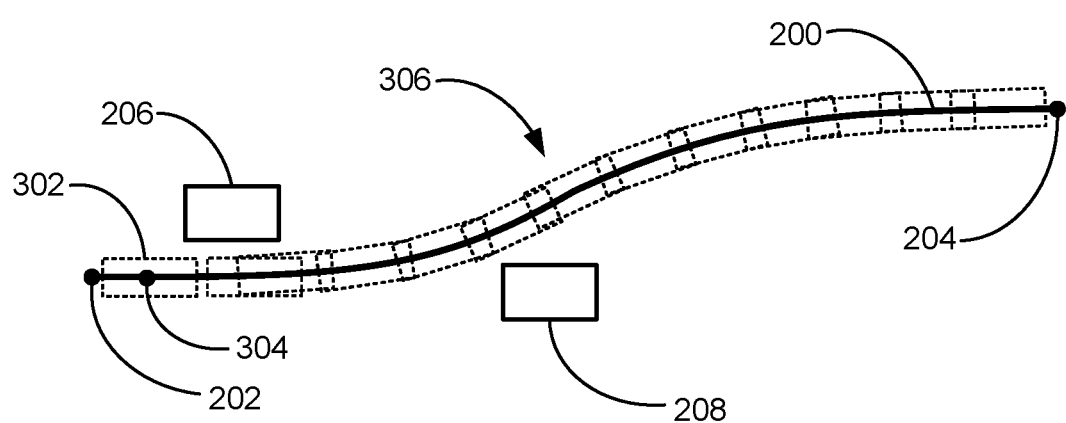
FIG. 3 is a diagram of an example vehicle trajectory including narrow static bounding boxes.

FIG. 3 is a diagram of an example traffic scene including detected objects and can be used to illustrate a technique for determining contact between a vehicle 110 traveling on a vehicle trajectory 200 and objects 206, 208. In FIG. 3, a bounding box 302 (dotted lines) that minimally encloses (i.e., is the smallest possible rectangle that can be drawn and still encompass all points on the vehicle) vehicle 110 at a time step to 304 can be centered on the vehicle trajectory 200. Centered on the vehicle trajectory 200 means that the center of the bounding box 302, which can also be the center of the vehicle 110 which the bounding box 302 encloses, is placed on the vehicle trajectory 200. A plurality of bounding boxes can be located at a plurality of locations centered on trajectory 200 at additional time steps $t_1 \ldots t_n$ to form a tube 306. Tube 306 predicts the locations that will be occupied by vehicle 110 as it travels along trajectory 200. That is, the tube 306 defines a location of the vehicle 110 on the trajectory 200 according to a center point of a line segment drawn perpendicularly to the trajectory 200 (or a tangent thereof where the trajectory 200 is curved) and extends from a first to a second side of the tube 306.

FIG. 3 indicates that vehicle 110 will be able to travel on trajectory 200 without contacting objects 206, 208. An issue with determining contact between a vehicle 110 and objects 206, 208 in this fashion is that the initial locations 202 of the vehicle 110 and the locations of vehicle 110 as it travels along trajectory 200 will include errors. Sensors 116 included in the vehicle 110 can vary in the accuracy with which the initial location 202 of vehicle 110 is determined. Operation of vehicle powertrain, steering and brakes can also vary in response to commands sent to powertrain, steering, and braking controllers 112, 113, 114 which can cause variance in how the vehicle 110 travels on the trajectory 200. Variance in the initial position of vehicle 110 and variance in how vehicle 110 travels on the trajectory 200 can cause the vehicle 110 to occupy locations outside of tube 306. This can cause a probability of contact between vehicle 110 and objects 206, 208 to be greater than zero.

Figure 4:
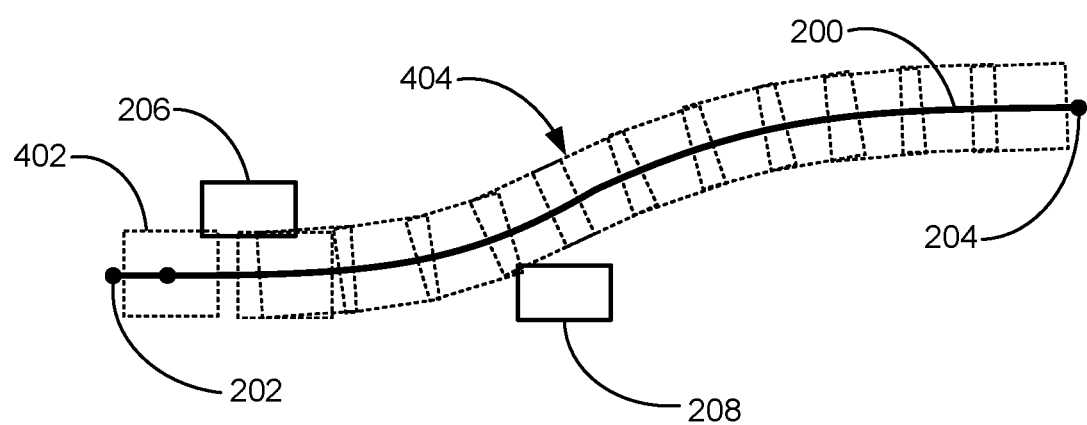
FIG. 4 is a diagram of an example vehicle trajectory including broad static bounding boxes.

FIG. 4 is a diagram of an example traffic scene including detected objects and can be used to illustrate a technique for determining contact between a vehicle 110 traveling on a trajectory 200 and objects 206, 208 that assumes an error in determining vehicle 110 locations. The error can be determined empirically by operating a vehicle 110 along a trajectory 200 while measuring the location of the vehicle 110 using external means. For example, an externally mounted stationary lidar sensor can acquire range data of the vehicle 110 as it travels on trajectory 200 a plurality of times and the externally acquired location data can be compared to the location data acquired by sensors 116 internal to the vehicle. Statistics, including means and standard deviations can be calculated based on the comparisons to determine probabilities of errors in location. For example, an error term can be determined based on an average of the error measurements as the vehicle travels on a trajectory 200.

Sample trajectories 200 can be determined that include respective ranges of vehicle velocities and lateral and longitudinal accelerations over specified segments (or lengths) of the trajectory that make up a total length or distance of the trajectory. A vehicle 110 can be operated on the sample trajectories 200, i.e., within the specified ranges over the specified segments, a plurality of times, for example greater than 10 times, and errors, indicated by the vehicle 110 occupying locations outside of the minimal tube 306, can be recorded. An average error term can be determined based on the sample trajectories 200 and added to a minimal bounding box 302 as described in relation to FIG. 3, above to determine bounding box 402, centered on vehicle trajectory 200 in FIG. 4. Bounding box 402, adjusted by adding an error term, is typically larger than the rectangular box 302 described above. Bounding box 402 can be determined to include the outline of the vehicle 110 plus an allowance for a statistical measure of the error in location based on the empirically acquired data. Bounding box 402 can provide greater confidence in avoiding objects by incorporating an error term in the predicted locations of a vehicle 110 as it travels on a vehicle trajectory 200.

The adjusted rectangular box 402 can be propagated along the trajectory 200 to determine a tube 404 that indicates the locations the vehicle 110 can assume as it travels along trajectory 200 including errors. For example, tube 404 can indicate potential locations of vehicle 110 including errors. Including three standard deviations of error statistics would yield a 99% probability that the vehicle 110 would operate within tube 404, assuming that the error terms follow Gaussian statistics. That is, in distributions that follow Gaussian statistics, 99% of the observations, in this example errors in vehicle locations, fall within three standard deviations of the average. Assuming that error terms are distributed equally in both directions from the vehicle trajectory 200, the average error would be 0. Tube 404 indicates that vehicle 110 would not have a 99% certainty of avoiding both objects 206, 208, and computing device 115 would not operate vehicle 110 on trajectory 200 from initial location 202, to end point 204.

An issue with error analysis as applied to vehicle 110 trajectories 200 as illustrated in FIG. 3 is that it can overstate probabilities of contact between a vehicle 110 and objects 206, 208 because the error in vehicle 110 location with respect to vehicle trajectory 200 is not constant as the vehicle 110 travels along a trajectory 200. Errors in the location of a vehicle 110 with respect to a vehicle trajectory 200 are a function of speed and lateral acceleration, etc. For example, the faster a vehicle 110 is changing direction, the more lateral acceleration the vehicle 110 is experiencing. High lateral acceleration in short time periods can generate greater errors in vehicle 110 control systems, for example. In general, changing directions can generate greater errors than following a straight line when traveling on a vehicle trajectory 200.

Techniques described herein can enhance the determination of probabilities of contact between a first object such as a vehicle 110 and other (or second) objects 206, 208 by dynamically determining first object, e.g., vehicle 110, occupancy as a function of trajectory. Vehicle occupancy, which is the location of an object such as vehicle 110 according to a user defined probability, can be determined as a function of velocity and lateral and longitudinal accelerations along a trajectory by operating a vehicle 110 along sample trajectories 200 a plurality of times and measuring errors in vehicle locations. Density distributions of error including mean and standard deviations are determined as a function of velocity and lateral and longitudinal accelerations. The resulting density distributions then be applied to a trajectory to be operated on by a vehicle 110 to determine probabilities of contact with objects 206, 208 at points or segments on the trajectory.

Figure 5:
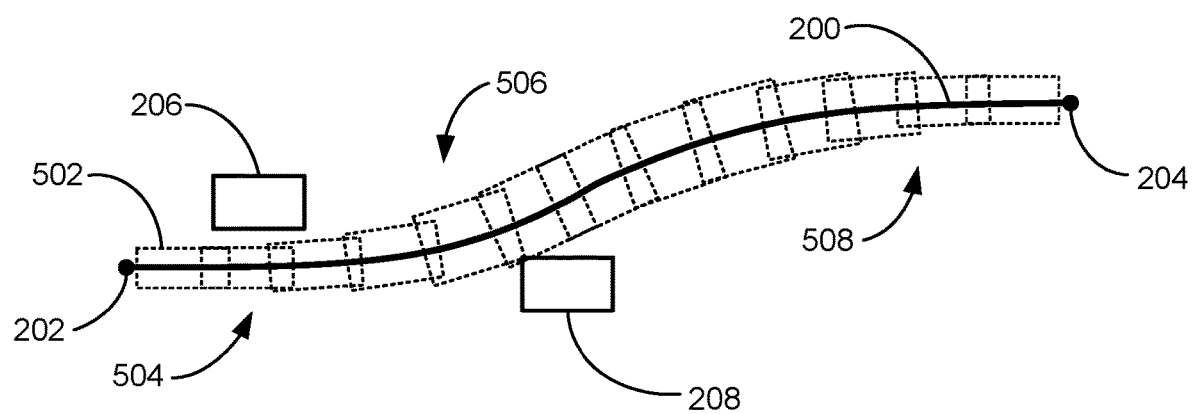
FIG. 5 is a diagram of an example vehicle trajectory including dynamic bounding boxes.

FIG. 5 illustrates a tube 506 formed by dynamic bounding boxes 502 determined according to techniques discussed herein. Dynamic bounding boxes 502 are determined dynamically, meaning that the size of the dynamic bounding box 502 is determined based on an estimate of the error included in the location of the vehicle determined at the location on the vehicle trajectory 200 upon which the dynamic bounding box 502 is located. The estimated error is the two-dimensional shape that indicates that probability that the vehicle 110 will occupy the location and orientation at a given location on a vehicle trajectory 200. The two-dimensional shape that indicates the probability that the vehicle 110 will occupy a location with an indicated orientation on a vehicle trajectory 200 can be determined based the estimated error being greater than a user selected value. For example, the two-dimensional shape can indicate a region where the probability that the vehicle 110 will be located is greater than 99%.

The two-dimensional shape that indicates the probability that a vehicle 110 will be located can be determined based on the curvature and distance between sample points of the trajectory 200. The curvature and distance between sample points of the trajectory 200 indicate the velocity and lateral and longitudinal accelerations of the vehicle 110 at that point. The estimated error in determining the location and orientation of the vehicle 110 is a function of the velocity and lateral and longitudinal accelerations of the vehicle 110. For example, rectangular boxes 504, 508 near the initial location 202 and the end point 204 are small relative to the vehicle trajectory 200 because at these locations vehicle 110 is moving in an approximately straight line, and errors in determining the location of the vehicle with respect to the trajectory 200 are low. In portions of the vehicle trajectory 200 where the vehicle 110 is changing direction, lateral accelerations are higher and the dynamic bounding boxes 502 are larger because the uncertainty in the location of the vehicle 110 is higher.

Determining vehicle trajectories 200 based on dynamic occupancy with dynamic bounding boxes 502 as illustrated in FIG. 5 permits greater range of operation for vehicles 110 while maintaining a desired level of confidence for avoiding contact, for example 99% confidence. In examples such as FIG. 5 dynamic bounding boxes 502 indicate that object 206 can likely be avoided while object 208 is likely not avoided. Determining potential contact in this fashion permits a computing device 115 in a vehicle 110 to make adjustments to avoid object 208. For example, trajectory 200 can be adjusted to avoid object 208. For example, the speed and/or the lateral acceleration of vehicle 110 can be adjusted to dynamic bounding boxes 502 near object 208 smaller. Lowering the speed and/or lateral acceleration can thereby reduce the size of the dynamic bounding boxes 502 and hence the dynamic occupancy of vehicle 110 in the vicinity of object 208. Speed and lateral acceleration can be adjusted by changing the vehicle trajectory to lower speeds and make turns begin sooner and change vehicle direction more slowly, for example.

Figure 6:
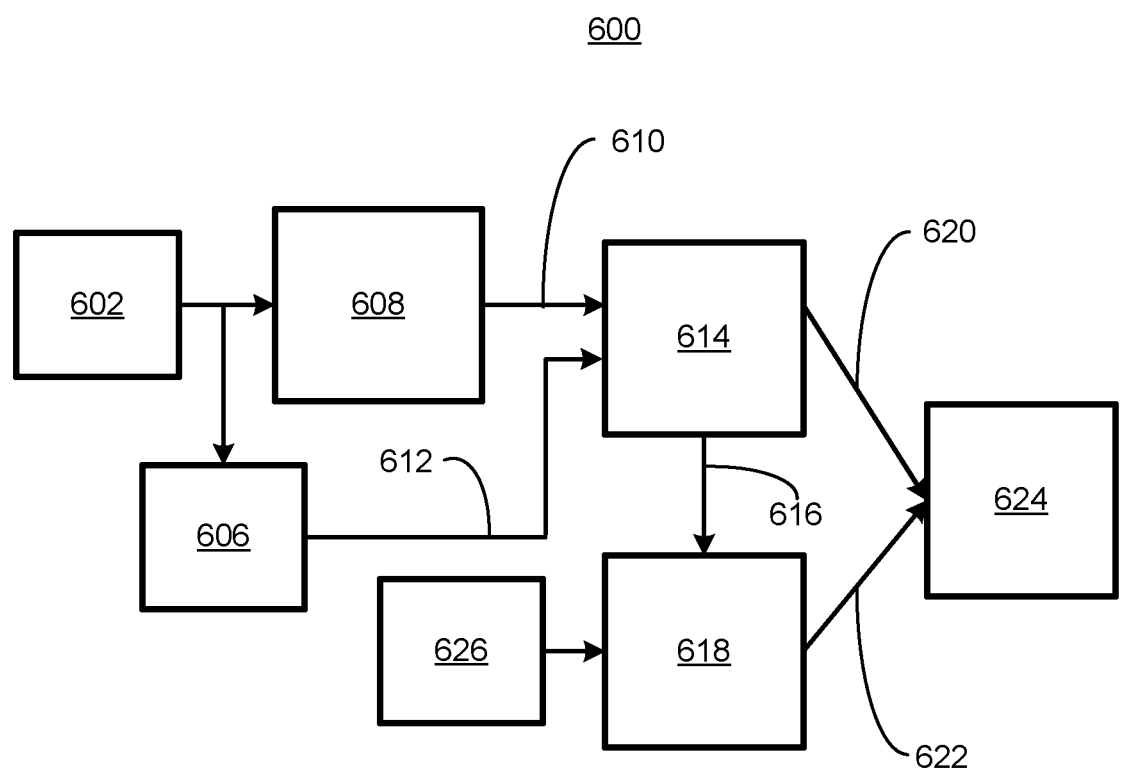
FIG. 6 is a diagram of an example dynamic occupancy system.

FIG. 6 is a diagram of a dynamic occupancy system 600 that calculates reachability tubes for vehicle trajectories 200 configured for training. A dynamic occupancy system 600 determines the locations that are likely to be occupied by a vehicle 110 dynamically as a function of vehicle 110 speed and lateral and longitudinal accelerations. Vehicle occupancy is indicated by a reachability tube determined by combining dynamic bounding boxes 502 that indicates the outer limit of locations that can be likely occupied by vehicle 110 (i.e., reachability refers to a location that a vehicle 110 can reach). FIG. 6 illustrates a dynamic occupancy system 600 configured for training and testing. A dynamic occupancy system 600 can be trained and tested on a server computer 120 and transmitted to a computing device 115 in a vehicle 110 for operation. A candidate trajectory 602 can be determined by motion planning software included in the vehicle 110 as discussed above in relation to FIG. 2. This trajectory is referred to a candidate trajectory 602 because it has not been determined to be appropriate for operation of the vehicle 110 until it is processed by dynamic occupancy system 600. The candidate trajectory 602 can be output to a vehicle or simulation software 606. In examples where a vehicle 110 is employed, the vehicle 110 is operated and the motion of the vehicle 110 in response to the candidate trajectory 602 is recorded. In examples where simulation software is employed, the simulation software determines simulated motion of a vehicle in response to the candidate trajectory 602.

The candidate trajectory 602 is input to a first neural network 608 which simplifies the candidate trajectory 602 to determine a simplified trajectory 610. A candidate trajectory 602 can be a T*n matrix that can include x and y locations, velocities, and heading angles at a plurality of time steps t. First neural network 608 reduces the candidate trajectory 602 to a simplified trajectory 610 that is a learned latent vector indicated by m dimensions, where m<n. The simplified trajectory 610 is input to a second neural network 614. Second neural network 614 has a plurality of layers including fully connected neurons with ReLU activation between layers. ReLU activation is a function between layers of the second neural network 614 that is a piecewise linear function that outputs the input directly if it is positive and outputs zero if it is negative.

The second neural network 614 determines density distributions for the input simplified trajectory 610 assuming that the density distributions are described by Liouville partial differential equations. The Liouville equation describes the time evolution of a distribution function along a trajectory and is derived from statistical mechanics. The Liouville equation:

$$\frac{d\rho}{dt} = \frac{\partial \rho}{\partial t} + \sum_{i=1}^{n}\left(\frac{\partial \rho}{\partial q_i}\dot{q}_i + \frac{\partial \rho}{\partial p_i}\dot{p}_i\right) = 0 \quad (2)$$

Describes a system with canonical coordinates $q_i$ and conjugate momenta $p_i$, where the phase distribution $\rho(p,q)$ determines the probability $\rho(p,q)d^n q d^n p$ that the system will be found in the system will be found in the phase space volume $d^n q d^n p$.

The second neural network 614 is trained by comparing the output vehicle trajectories 620 to ground truth measured vehicle trajectories 612 from real world vehicles 110 or simulation software 606. The second neural network 614 is further trained based on stochastic gradient descent with L2-norm reconstruction loss because Liouville partial differential equations are continuously differentiable. An L2-norm calculates the Euclidian distance between the density distribution output from the second neural network and the ground truth. The weights from the trained second neural network 614 are output to a polyhedral marching system 618 which inputs initial density distribution data 626 for the initial location 202 of the candidate trajectory 602. The initial density distribution data 626 can be determined empirically based on the speed and direction of the vehicle 110 at the initial location 202.

Training the second neural network 614 based on recorded behavior of vehicles 110 determines weights that control the behavior of the layers of the second neural network 614. The weights control the sizes of density distributions that indicate the distances from a point on the trajectory that a vehicle will occupy based on the curvature of the trajectory for a user determined probability. For example, based on real world vehicle 110 data, the second neural network 614 can determine density distributions that indicate that a vehicle 110 will occupy a distance from the trajectory with 99% probability. Weights indicating these density distributions determined as a function of trajectory curvature can be output to polyhedral marching system 618. Polyhedral marching system 618 can then determine vehicle occupancy based on trajectory curvature without having to calculate density distributions to permit the polyhedral marching system 618 to determine dynamic bounding boxes 502 in real time in a computing device 115 in a vehicle 110.

Polyhedral marching system 618 generates polyhedrals 622. A polyhedral 622 is an n-sided geometric shape determined at each time step t of the candidate trajectory 602. The sides of the polyhedral 622 are based on the weights determined by training the second neural network 614 and are the distances from the candidate trajectory 602 where the probability of encountering any portion of the vehicle 110 is lower than an empirically determined threshold without having to calculate density distributions. The empirically determined threshold can be determined to avoid a user determined percentage of contacts between a vehicle and an object, for example 99%. Polyhedral marching system 618 begins by selecting a first point on a candidate trajectory 602. The beginning point can be and initial location 202 for vehicle 110, for example. Polyhedral marching system 618 then determines a polyhedral shape centered at the first point. A polyhedral is a two-dimensional shape having n sides, where n is a user-selected value. Setting n=4 produces rectangles, setting n=5 produces pentagrams, etc. Higher values of n can produce more accurate predictions of vehicle reachability but require greater time to compute. Values of n=6-8 are good compromises between accuracy and compute time.

Polyhedral marching system 618 proceeds by calculating polyhedrals indicating that the probability that a vehicle will occupy a location along a line from the first point perpendicular to a first side of the polyhedral is greater than the predetermined probability. The first side of the polygon is placed at a distance from the first point on the candidate trajectory 602 based on the weights input from the trained second neural network. The distance from the point on the candidate trajectory can be determined without having to calculate the density distribution. The data from the calculation of the density distribution as a function of trajectory curvature and sample distance is included in the weights input from the second neural network. Sample distance is the distance between adjacent points on a trajectory where the location of the vehicle 110 was predicted. Polyhedral marching then selects the next side of the polyhedral and calculates the location of the second side of the polyhedral in similar fashion and so on until distances to all the sides of the polyhedral are selected.

Polyhedral marching system 618 then selects a next point on the candidate trajectory 602 at the next time step and determines a next polyhedral based on the speed and lateral and longitudinal accelerations can be based on the curvature and distance between samples of a segment of the candidate trajectory 602 at the next point on the candidate trajectory 602. The next polyhedral is combined with the first polyhedral by logically ORing the two polyhedrals together. The polyhedral marching system 618 then proceeds along the candidate trajectory 602, incrementing the time step and selecting the point on the candidate trajectory 602 at the incremented time step and combining the resulting polyhedral with the previously determined polyhedrals to produce polyhedrals 622.

Polyhedrals 622 output by the polyhedral marching system 618 can be combined to form dynamic bounding boxes 502 that can be further combined to form a reachable tube 624 which describes two-dimensional regions around a candidate trajectory 602 that has a user-selected probability of including the vehicle 110. For example, a reachable tube 624 encloses the candidate trajectory 602 and indicates that a vehicle 110 traveling along the candidate trajectory 602 has a less than a selected probability, 1% for example, of contacting an object that lies outside of the reachable tube 624. The reachable tube 624 enhances the ability to operate a vehicle 110 by including dynamical bounding boxes 502 that are sized based on vehicle speed and rate of change of direction to accurately determine probabilities of contact with external objects 206, 208. In examples where the objects are roadway lane markers the reachable tube 624 can indicate the probability that a candidate trajectory 602 will permit the vehicle 110 to remain within a roadway lane, e.g., lane keeping. In examples where the objects include both lane markers and other vehicles, the reachable tube 624 can indicate the probability that a candidate trajectory 602 will permit a vehicle 110 to change lanes in traffic.

Determining vehicle trajectories 200 based on dynamic occupancy system 600 that calculates reachability tubes enhances determination of vehicle trajectories 200 by determining a reachable tube 624 based on polyhedrals 622 that indicate probabilities of contact with objects 206, 208 at a plurality of locations along the trajectory 200 in real time in a computing device 115 included in a vehicle 110. Each polyhedral 622 is of a size and shape that matches the density distributions of output vehicle trajectories 620 determined by second neural network 614 which was trained based on ground truth measured vehicle trajectories 612 from a plurality of vehicles or simulation software, without having to determine the density distributions in real time. Dynamic occupancy system 600 can determine reachable tubes 624 in real time as a vehicle 110 is being operated on a roadway at highway speeds using a computing device 115 included in a vehicle 110.

Figure 7:
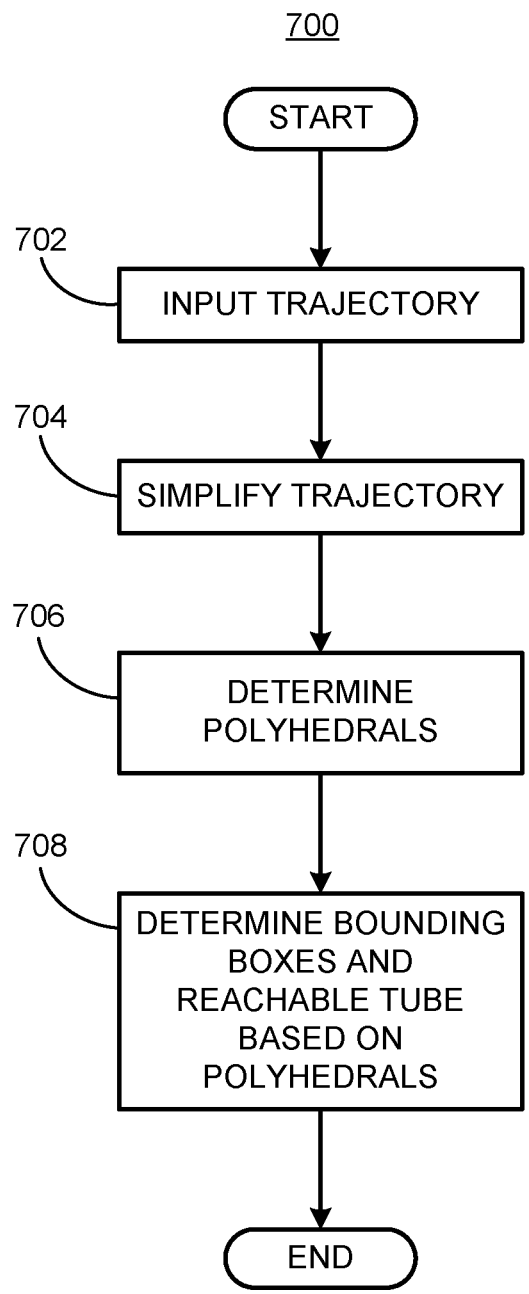
FIG. 7 is a flowchart diagram of an example process to generate dynamic bounding boxes.

FIG. 7 is a flowchart, described in relation to FIGS. 1-6 of a process 700 for determining a trajectory for a vehicle 110. Process 700 can be implemented by a processor of a computing device 115, taking as input a candidate trajectory 602, executing commands, and outputting a reachable tube 624. Process 700 includes multiple blocks that can be executed in the illustrated order. Process 700 could alternatively or additionally include fewer blocks or can include the blocks executed in different orders.

Process 700 begins at block 702, where a candidate trajectory 602 is input from motion control software included in a computing device 115 in a vehicle 110 along with locations of objects in an environment around vehicle 110. A candidate trajectory 602 is discussed in relation to FIG. 2, above.

At block 704 a first neural network 608 inputs the candidate trajectory 602 and outputs a simplified trajectory 610.

At block 706 a polyhedral marching system 618 determines polyhedrals based on an the simplified trajectory 610, initial density distribution data 626 and weights 616 output by the second neural network 614 at training time.

At block 708 polyhedrals 622 are combined to form dynamic bounding boxes 502 and further combined to form a reachable tube 624. The reachable tube 624 along with can be output to computing device 115. Following block 708 process 700 ends.

Figure 8:
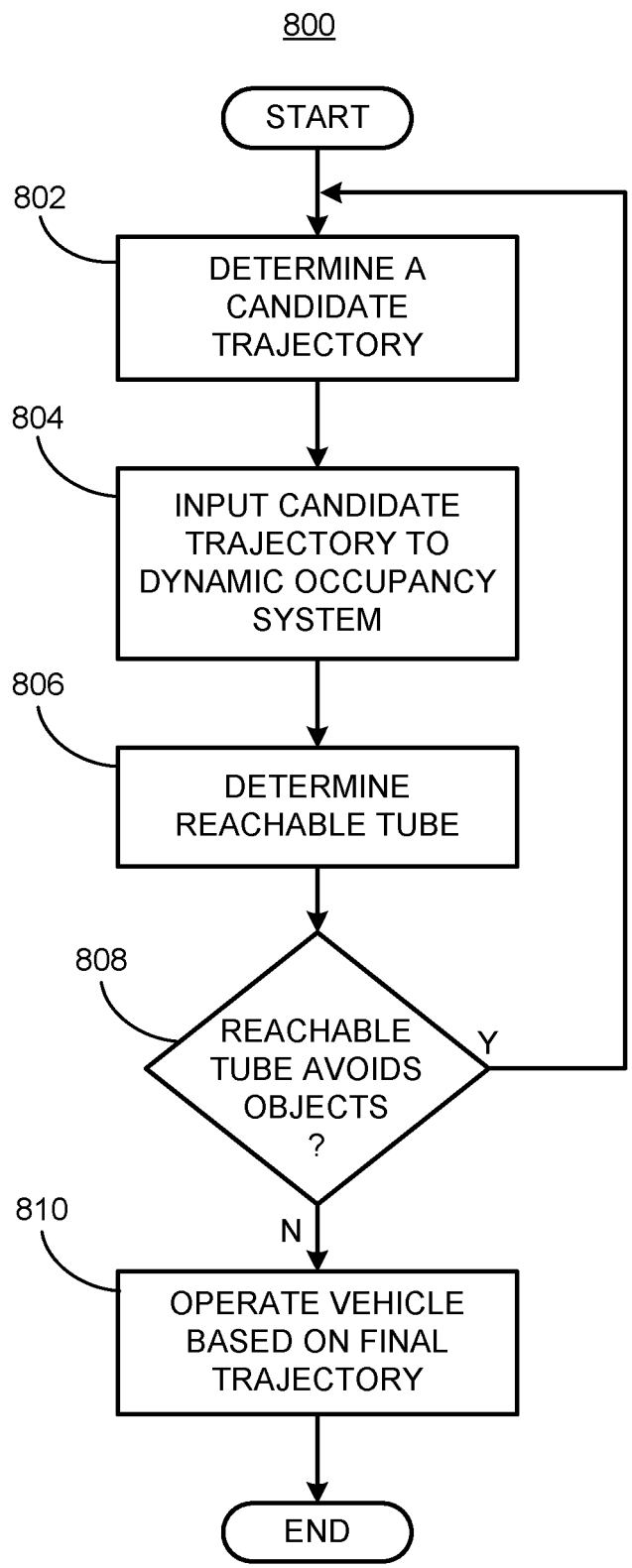
FIG. 8 is a flowchart diagram of an example process to operate a vehicle based on dynamic bounding boxes.

FIG. 8 is a flowchart, described in relation to FIGS. 1-7 of a process 800 for operating a vehicle 110 based on a reachable tube 624 determined by a dynamic occupancy system 600. Process 800 can be implemented by a processor of a computing device 115, taking as input a vehicle trajectory, executing commands, and operating a vehicle. Process 800 includes multiple blocks that can be executed in the illustrated order. Process 800 could alternatively or additionally include fewer blocks or can include the blocks executed in different orders.

At block 802 sensors 116 included in a vehicle 110 can input data regarding an environment around the vehicle 110. For example, sensor 116 can input image data regarding the lane markers and objects 206, 208 on the roadway. A computing device 115 in the vehicle 110 can input the sensor data to software programs included in the computing device 115 to determine a candidate trajectory 602 upon which to operate the vehicle 110.

At block 804 the computing device can input the candidate trajectory 602 and data regarding objects 206, 208 around a vehicle 110 to a dynamic occupancy system 600 as described in relation to FIG. 7, above.

At block 806 the dynamic occupancy system 600 outputs a reachable tube 624 including dynamic bounding boxes 502 based on the candidate trajectory 602 to computing device 115.

At block 808 process 800 determines whether the reachable tube 624 avoids objects 206, 208. Objects 206, 208 can include lane markers, other vehicles, and pedestrians, for example. Avoiding objects 206, 208 can include lane keeping, avoiding contact with other vehicles and pedestrians, and successfully performing a lane change maneuver, for example. In examples where reachable tube 624 does not successfully avoid objects 206, 208, computing device 115 can return to block 802 to determine a new candidate trajectory 602 that reduces the probability of contact with objects 206, 208 by moving the candidate trajectory 602 away from the objects 206, 208, slowing the speed of the vehicle 110 or reducing the lateral and longitudinal accelerations in the vicinity of the object 206, 208, for example. When reachable tube 624 does not intersect an object 206, 208, candidate trajectory 602 becomes the final trajectory and process 800 passes to block 810.

At block 810 the computing device 115 in vehicle 110 determines commands to output to controllers 112, 113, 114 to control vehicle powertrain, vehicle steering and vehicle brakes to operate vehicle 110 based on the final trajectory. Following block 810 process 800 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:
a computer that includes a processor and a memory, the memory including instructions executable by the processor to determine a final trajectory by:
determining a candidate trajectory of a first object based on a detected second object;
inputting the candidate trajectory to a reachable polyhedral marching processor to determine dynamic occupancy polyhedrals based on a shape of the candidate trajectory wherein the sizes of the dynamic occupancy polyhedrals are based on estimates of errors;
determining a reachable tube based on combining the dynamic occupancy polyhedrals; and
determining the final trajectory based on the reachable tube avoiding the detected second object.

2. The system of claim 1, wherein the instructions include further instructions to operate the first object based on the final trajectory by controlling actuators to control movement of the first object.

3. The system of claim 2, wherein the first object is a vehicle and controlling the actuators to control the movement of the vehicle include controlling one or more of vehicle powertrain, vehicle steering and vehicle brakes.

4. The system of claim 2, wherein the first object is a robot and controlling the actuators to control the movement of the robot include controlling movement of one or more of a gripper and a robotic arm.

5. The system of claim 1, the instructions including further instructions to input the candidate trajectory to a first neural network to simplify the candidate trajectory.

6. The system of claim 5, wherein the candidate trajectory is a T*n matrix that includes x and y locations, velocities, and heading angles at a plurality of time steps t and simplifying the trajectory reduces the T*n matrix to a vector with m dimensions, where m<T*n.

7. The system of claim 1, wherein the reachable polyhedral marching processor is programmed based on weights output from a second neural network.

8. The system of claim 7, wherein the second neural network determines density distributions based on solving Liouville partial differential equations.

9. The system of claim 8, wherein the second neural network is trained based on a plurality of trajectories acquired from real world vehicles.

10. The system of claim 9, wherein the second neural network includes fully connected neurons with ReLU activation and is trained based on stochastic gradient descent with L2-norm reconstruction loss.

11. The system of claim 1, wherein the dynamic occupancy polyhedrals include two-dimensional regions wherein a probability that the first object will occupy locations within the reachable polyhedrals is higher than an empirically determined threshold.

12. The system of claim 1, wherein the sizes of the dynamic occupancy polyhedrals are based on curvature and a distance between samples of segments of the candidate trajectory.

13. A method, comprising:
determining a final trajectory by:
determining a candidate trajectory of a first object based on a detected second object;
inputting the candidate trajectory to a reachable polyhedral marching processor to determine dynamic occupancy polyhedrals based on a shape of the candidate trajectory wherein the sizes of the dynamic occupancy polyhedrals are based on estimates of errors;
determining a reachable tube based on combining the dynamic occupancy polyhedrals; and
determining the final trajectory based on the reachable tube avoiding the detected second object.

14. The method of claim 13, wherein the first object is operated based on the final trajectory by controlling one or more actuators to control movement of the first object.

15. The method of claim 14, wherein the first object is a vehicle and controlling the actuators to control the movement of the vehicle includes controlling one or more of vehicle powertrain, vehicle steering and vehicle brakes.

16. The method of claim 14, wherein the first object is a robot and controlling the actuators to control the movement of the robot includes controlling motion of one or more of a gripper and a robotic arm.

17. The method of claim 13, further comprising inputting the candidate trajectory to a first neural network to simplify the candidate trajectory.

18. The method of claim 17, wherein the candidate trajectory is a T*n matrix that includes x and y locations, velocities, and heading angles at a plurality of time steps t and simplifying the trajectory reduces the T*n matrix to a vector with m dimensions, where m<T*n.

19. The method of claim 13, wherein the reachable polyhedral marching processor is programmed based on weights output from a second neural network.

20. The method of claim 19, wherein the second neural network determines density distributions based on solving Liouville partial differential equations.

* * * * *